Jan. 18, 1949.  A. H. DAVIS  2,459,416
ADAPTER FOR BORING BARS
Filed April 22, 1948                 2 Sheets-Sheet 1
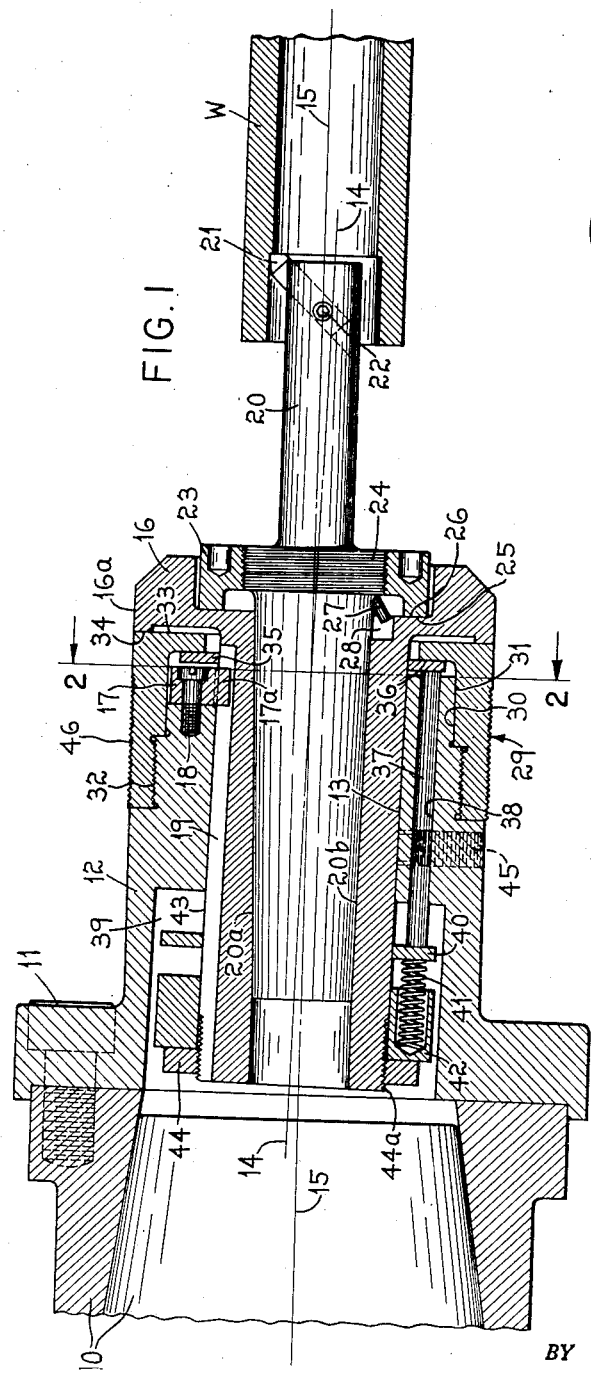
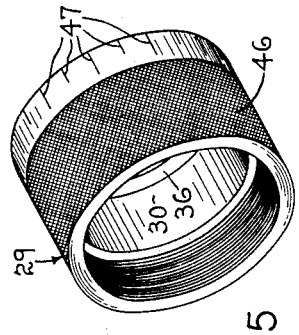
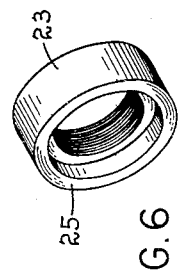
INVENTOR.
ADOLPH H. DAVIS
BY
Toulmin & Toulmin
ATTORNEYS.

Jan. 18, 1949.  A. H. DAVIS  2,459,416
ADAPTER FOR BORING BARS
Filed April 22, 1948

INVENTOR.
ADOLPH H. DAVIS
BY
ATTORNEYS.

Patented Jan. 18, 1949

2,459,416

UNITED STATES PATENT OFFICE 2,459,416

ADAPTER FOR BORING BARS

Adolph H. Davis, Norwood, Ohio, assignor to The R. K. LeBlond Machine Tool Company, Cincinnati, Ohio, a corporation of Delaware Application April 22, 1948, Serial No. 22,659

3 Claims. (Cl. 77—58)

This invention pertains to improvements in boring bars for machine tools and is particularly directed to an improved means for affecting the depth of cut adjustment for the cutting bit of the boring bar.

One of the most difficult problems in operating a boring bar is to provide a nicety of radial adjustment of the boring tool bit, so as to affect the precise and accurate sizing of the work piece being operated upon. In former devices inaccuracy and difficulty in making minute depth adjustments in the nature of tenths of a thousandth of an inch have rendered former apparatus of this type unsatisfactory and impractical for ordinary high production methods.

One of the objects of the present invention is to provide an improved boring bar arrangement in which the cutting tool bit may be accurately and precisely adjusted in radial direction to affect a precise sizing of the hole being bored in the work piece.

Still another object of this invention is to provide a boring bar adjusting means in which the boring tool is moved at a relatively large increment parallel to the axis of the boring machine spindle while at the same time affecting very minute radial adjustment of the cutting tool bit.

Another object of this invention is to provide a boring bar cutting depth adjusting mechanism including an axially shiftable boring bar holder on the tool spindle having a movement at a slight angular relationship to the axis of rotation of the boring bar and spindle, so as to cause radial displacement of the cutting tool bit of the boring bar during the actual positioning of the boring bar holder on the tool spindle.

It is a still further object to provide in a boring tool adjusting device, a spring tension mechanism to eliminate back lash in the adjusting mechanism and which maintains a uniform condition of compression through the entire adjusting movement.

Figure 1 is an enlarged fragmentary sectional view on the line 1—1 of Figure 2, showing the general assembly of the boring bar and its associated adjusted mechanism.

Figure 5 is a perspective view of the micrometer adjusting collar.

Figure 6 is a perspective view of the knock out nut for removing the boring tool holder shank.

Figure 4:
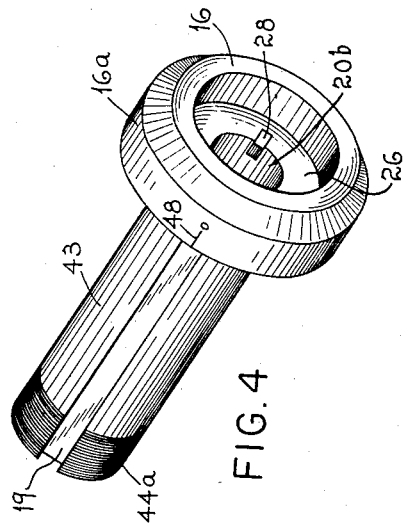
Figure 4 is a perspective view of the adjustable depth control sleeve of the boring bar.
Figure 3:
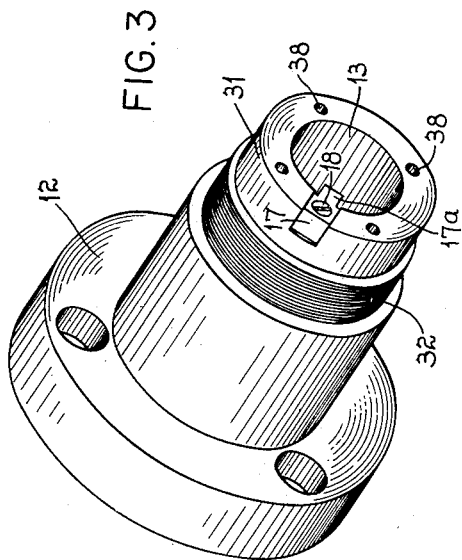
Figure 3 is a perspective view of the spindle mounting bushing for the boring bar.
Figure 2:
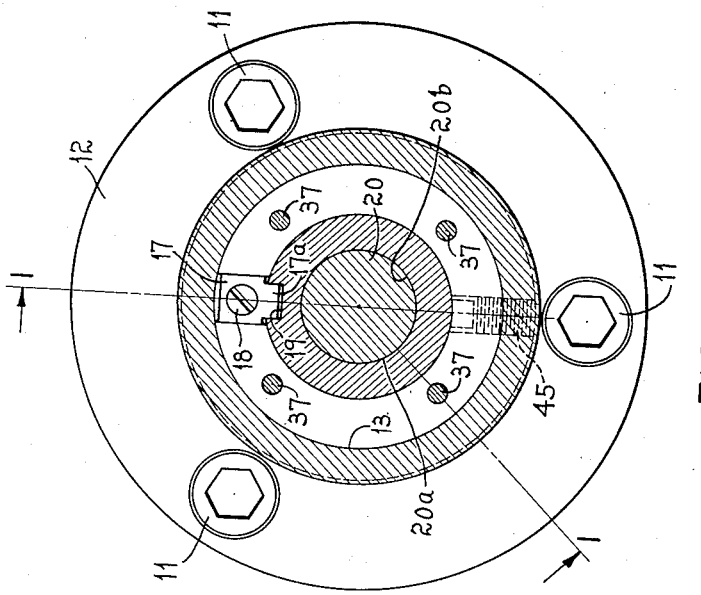
Figure 2 is a transverse section on the line 2—2 Figure 1.

For exemplary purposes this invention is shown applied to the rotatable tool spindle 10 of a machine tool. Rigidly fixed to the total spindle 10 by suitable screws 11 is the mounting bushing 12. An angularly disposed bore 13 having an axis 14 slightly inclined to the axis of rotation 15 of the tool spindle 10, is formed in the bushing 12.

Nicely fitted for axial sliding movement in the bore 13 is the boring tool shank carrying sleeve 16, which is guided against rotation in the bore 13 by a suitable key 17 rigidly attached to the bushing 12 by a screw 18. The tongue 17 has a downwardly extending end 17a nicely slidingly fitting in the keyway 19 formed longitudinally of the sleeve member 16. A boring tool shank 20 has a tapered portion 20a which fits in the complementary tapered bore 20b formed in the member 16. The axis of the tapered bore 20b is parallel to the axis 15 of the tool spindle rotation. A suitable cutting tool bit 21, fixed by a suitable clamping screw 22, is provided upon the outer shank 20, in a position to operate on the work piece W.

In order to facilitate removal of the shank 20 from the tapered bore 20b in the member 16 a knock out nut 23 mounted on the threaded portion 24 of the shank 20 is provided, which when rotated causes its abutment face 25 to engage the surface 26 of the member 16 to thereby draw the shank 20 outwardly from the tapered bore 20b for easy removal. The nut 23 is then adjusted back when the bar is again placed in the tapered bore, so that under ordinary operating conditions the surfaces 25 and 26, when the shank is fully mounted in the boring tool holder, are not in contact. A drive pin 27 fixed in the boring tool shank 20 engages in a slot 28 formed in the member 16 so as to affect a positive drive from the member 16 to the boring tool shank for the cutting operation.

It can be seen that by axially shifting the member 16 longitudinally along the axis 14 that relatively fine radial displacement will take place in the cutting tool bit, so that in this manner precise and accurate fine adjustment of radial positioning of the tool 21 with regard to the work W may be readily affected. In order to accomplish this adjustment with a high degree of accuracy and with a minimum of skill and error upon the part of the operator, there is provided a micrometer adjusting collar 29, having a bore 30 journaled on a diameter portion 31 formed on the member 12. The adjusting collar 29 is connected through a threaded connection 32 to the member 12 so that upon rotation of the nut 29 it will be displaced axially along the axis 15 of bushing member 12. The nut 29 is provided with an abutment face 33 on one side which engages in direct positive contact with the radial face 34 on the enlarged flange portion 16a of the member 16 so as to move the member 16 longitudinally in the bore 13, to the right as seen in Figure 1, affecting withdrawal of the cutting tool bit 21 from the bore in the work piece so as to reduce the diameter of the hole being cut. Adjusting the nut 29 for movement away from the surface 34 causes the sleeve member 16 to move to the left, Figure 1, by the operation of apparatus comprising the abutment collar 35 which engages the inner abutment surface 36 on the other side of the adjusting nut 29 and applies force through the push rods 37 slideably guided in bores 38 in the member 12 and extending rearwardly into the counterbore 39 formed in the member 12.

A second abutment collar 40 engages the series of push rods 37 and is held thereagainst by means of compression springs 41 carried in a collar 42 slideable on the outer diameter 43 of the member 16 and adjustably held in position thereon in opposition to the compression springs 41 by an adjusting nut 44 threaded at 44a on the member 16. In this way back-lash free contact is maintained between the surface 34 of the member 16 and the surface 33 of the micrometer adjusting collar 29 while constant uniform pressure is at all times maintained through the push rods 38 by the springs 41 against the interface 36 of the adjusting nut 29. Thus by rotating the adjusting collar 29 in one direction or the other, a back-lash free adjustment is affected in axially shifting the member 16 along the axis 14 to obtain in and out radial adjustment of the cutting tool bit 21 with respect to the bore being cut in the work piece, W.

Preferably there is provided a locking screw 45 threaded into the member 12 and engaging the surface 43 of the member 16, so that after the adjustment has been made by rotating the adjusting collar, 29, the screw 45 may be tightened to prevent any possible movement of the member 16 relative to the member 12 for the desired depth of cut to be taken. The adjusting collar 29 is preferably provided with a knurled surface 46 for easy manual rotation of the collar. A series of graduations 47, preferably corresponding to tenths of a thousandth of an inch of radial adjustment of the cutting tool bit 21, are formed on the collar and are correlated to a zero marking indication 48 provided on the member 16, so that the operator may readily directly obtain the exact amount of tool adjustment in radial direction by examining the indices 47 with regard to the zero indication 48.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

What is claimed is:

1. In an adjustable boring tool support having a rotatable tool spindle member, a tool shank, and means for mounting said tool shank on said rotatable member including, means to affect an axial adjustment of said tool shank in an acute angular relationship to the axis of rotation of said tool spindle so as to affect an accurately controlled radial adjustment of the tip of a cutting tool bit on said tool shank, micrometer nut means, a resilient back-lash free connection from said tool shank member to one side of said nut means, and a direct positive connection from said shank member to the opposite side of said nut means so that rotation of said nut means affects minute and accurately controlled positions of axial adjustment of said tool shank while a constant contact pressure is maintained at said connections for any position of said adjustment.

2. In a boring tool holder assembly the combination of a rotatable tool spindle mounting member, an angularly disposed guideway in said member arranged in an acute angular relationship to the axis of rotation of the tool spindle member, a boring tool holder mechanism mounted for relative axial movement in said bore including means to arrest rotary motion of said bit holder in said bore, and resilient compression means acting in a direction parallel to said guideway for normally urging said boring tool holder in a direction for advancing a cutting bit in said tool holder toward a bore in the work piece being machined, micrometer collar adjusting means disposed between said resilient means and said boring tool holder mechanism operable to accurately position said tool bit holder in its axial positions for affecting a radial adjustment of said cutting bit relative to the bore being machined in the work, and locking screw means to lock out relative movement between said tool spindle support member and said tool bit shank holder.

3. In an adjustable boring tool holder, a rotatable bushing member having an angularly disposed bore therein, a sleeve member axially slidable in said bore, an adjusting nut threadedly mounted on said bushing member having a face on one side directly engaging an abutment face on said sleeve member, and a resilient member carried by said sleeve member interacting between said sleeve member and the opposite side of said nut from the face of the nut engaging said sleeve member in a direction parallel to the axis of said angularly disposed bore.

ADOLPH H. DAVIS.

REFERENCES CITED

The following references are of record in the file of this patent:

UNITED STATES PATENTS

| Number | Name | Date |
|---|---|---|
| 842,381 | Benicke | Jan. 29, 1907 |
| 2,314,483 | De Vlieg | Mar. 23, 1943 |